United States Patent
Yan et al.

(10) Patent No.: US 10,789,376 B2
(45) Date of Patent: Sep. 29, 2020

(54) BLOCKCHAIN AUTHORIZATION (71) Applicant: Alibaba Group Holding Limited, George Town (KY)

(72) Inventors: Wenyuan Yan, Hangzhou (CN); Xinying Yang, Hangzhou (CN); Yuan Zhang, Hangzhou (CN); Yize Li, Hangzhou (CN); Benquan Yu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/805,649

(22) Filed: Feb. 28, 2020

(65) Prior Publication Data

US 2020/0202016 A1 Jun. 25, 2020

Related U.S. Application Data

(63) Continuation of application No. PCT/CN2020/072062, filed on Jan. 14, 2020.

(30) Foreign Application Priority Data

Jun. 28, 2019 (CN) .......................... 2019 1 0579351

(51) Int. Cl.
*G06F 21/00* (2013.01)
*G06F 21/60* (2013.01)
(Continued)

(52) U.S. Cl.
CPC ............ *G06F 21/604* (2013.01); *G06F 16/27* (2019.01); *G06F 21/6227* (2013.01); *H04L 9/30* (2013.01);
(Continued)

(58) Field of Classification Search
CPC .... G06F 21/604; G06F 21/6227; G06F 16/27; H04L 9/3236; H04L 9/30; H04L 2209/38
See application file for complete search history.

(56) References Cited

U.S. PATENT DOCUMENTS 10,600,009 B1 * 3/2020 Augustine ............. H04L 9/0637
2017/0250972 A1 * 8/2017 Ronda ................... H04L 9/3236
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mahfuzur Rahman
(74) *Attorney, Agent, or Firm* — Fish & Richardson P.C (57) ABSTRACT

A computer-implemented method includes: receiving, by a server storing one or more blockchain ledgers, an authorization request from a client, in which the authorization request includes a service end identifier and a user identifier; generating, based on the authorization request, a database authorization instruction corresponding to the authorization request and a ledger identifier corresponding to the authorization request; authorizing a service end corresponding to the service end identifier as a user in a blockchain ledger corresponding to the ledger identifier; configuring a permission value of the user in the blockchain ledger, in which the permission value determines a degree to which the service end can operate the blockchain ledger; and sending authorization information including the user identifier and the ledger identifier to the service end.

17 Claims, 4 Drawing Sheets

(51) Int. Cl.
    *G06F 21/62*         (2013.01)
    *H04L 9/32*          (2006.01)
    *G06F 16/27*         (2019.01)
    *H04L 9/30*          (2006.01)

(52) U.S. Cl.
    CPC ........ *H04L 9/3236* (2013.01); *H04L 2209/38* (2013.01)

(56) References Cited

U.S. PATENT DOCUMENTS

| | | |
|---|---|---|
| 2019/0073666 A1* | 3/2019 | Ortiz ..................... G06F 16/27 |
| 2019/0164157 A1* | 5/2019 | Balaraman ............. G06Q 20/40 |
| 2019/0296920 A1* | 9/2019 | Uhr ........................ H04W 12/08 |
| 2019/0340607 A1* | 11/2019 | Lynn .................. G06Q 20/3829 |
| 2019/0375373 A1* | 12/2019 | Pepe .................... B60R 25/246 |
| 2020/0084027 A1* | 3/2020 | Duchon ................ H04L 9/0825 |
| 2020/0117690 A1* | 4/2020 | Tran .................... G06F 16/9536 |
| 2020/0127832 A1* | 4/2020 | Ebrahimi ............. H04L 9/3213 |

OTHER PUBLICATIONS

Nakamoto, "Bitcoin: A Peer-to-Peer Electronic Cash System," www.bitcoin.org, 2005, 9 pages.

\* cited by examiner

BLOCKCHAIN AUTHORIZATION

CROSS-REFERENCE TO RELATED APPLICATIONS

This application is a continuation of PCT Application No. PCT/CN2020/072062, filed on Jan. 14, 2020, which claims priority to Chinese Patent Application No. 201910579351.5, filed on Jun. 28, 2019, and each application is hereby incorporated by reference in its entirety.

TECHNICAL FIELD

Implementations of the present specification relate to the field of information technologies, and in particular, to authorization methods, systems, and apparatuses in a blockchain-type ledger that stores data based on a blockchain data structure (e.g., in a form of a blockchain), and devices.

BACKGROUND

When a database server provides a ledger service to a user by using a blockchain-type ledger, the user usually adds other related service ends (the service ends include other enterprise service ends or natural person service ends) to a ledger or removes other related service ends from the ledger, so that the service end can also have a corresponding operation permission in the ledger.

SUMMARY

Implementations of the present application aim to provide authorization solutions convenient in a blockchain-type ledger.

To alleviate the previous technical problem, the implementations of the present application are implemented as follows:

An authorization method in a blockchain-type ledger is provided and is applied to systems including a client, a database server, and a service end. The method includes: receiving, by the client, an operation instruction of a user, determining a to-be-authorized service end, generating an authorization request including a service end identifier and a user identifier, and sending the authorization request to the database server; determining, by the database server, a corresponding database authorization instruction and ledger identifier based on the authorization request, executing the database authorization instruction, determining the to-be-authorized service end as a user in a ledger corresponding to the ledger identifier, and determining an operation permission of the service end in the ledger; sending, by the database server, authorization information including the user identifier and the ledger identifier to the service end; and writing, by any service end receiving the authorization information, a mapping relationship between the user identifier and the ledger identifier into an operable ledger list of the service end, and storing the mapping relationship.

Correspondingly, an implementation of the present specification further provides an authorization system in a blockchain-type ledger, including a client, a database server, and a service end.

In the system, the client receives an operation instruction of a user, determines a to-be-authorized service end, generates an authorization request including a service end identifier and a user identifier, and sends the authorization request to the database server.

The database server determines a corresponding database authorization instruction and ledger identifier based on the authorization request, executes the database authorization instruction, determines the to-be-authorized service end as a user in a ledger corresponding to the ledger identifier, and determines an operation permission of the service end in the ledger.

The database server sends authorization information including the user identifier and the ledger identifier to the service end.

Any service end receiving the authorization information writes a mapping relationship between the user identifier and the ledger identifier into an operable ledger list of the service end, and stores the mapping relationship.

According to another aspect, an implementation of the present specification further provides an authorization method in a blockchain-type ledger. The method is applied to a database server and includes: receiving an authorization request sent by a client, where the authorization request includes a service end identifier and a user identifier; determining a corresponding database authorization instruction and ledger identifier based on the authorization request; executing the database authorization instruction, determining a service end corresponding to the service end identifier as a user in a ledger corresponding to the ledger identifier, and determining an operation permission of the service end in the ledger; and sending authorization information including the user identifier and the ledger identifier to the service end.

Corresponding to the another aspect, an implementation of the present specification further provides an authorization apparatus in a blockchain-type ledger. The apparatus is applied to a database server and includes: a receiving module, configured to receive an authorization request sent by a client, where the authorization request includes a service end identifier and a user identifier; a determining module, configured to determine a corresponding database authorization instruction and ledger identifier based on the authorization request; an execution module, configured to: execute the database authorization instruction, determine a service end corresponding to the service end identifier as a user in a ledger corresponding to the ledger identifier, and determine an operation permission of the service end in the ledger; and a sending module, configured to send authorization information including the user identifier and the ledger identifier to the service end.

In the solutions in the implementations of the present specification, the client initiates the authorization request to the database server based on an instruction of the user. The database server converts the authorization request into a corresponding database command operation, and adds a new user to the ledger and determines a user permission by using a database command. In addition, the service end updates the operable ledger list of the user, so that a service party can write a service record related to the user into the ledger. In addition, the user can de-authorize a related authorized service party in the ledger, so as to help the user manage operating members in the ledger.

It should be understood that the previous general description and the following detailed description are merely examples and explanations, and are not intended to limit the implementations of the present specification.

In addition, any of the implementations in the present specification implementation does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
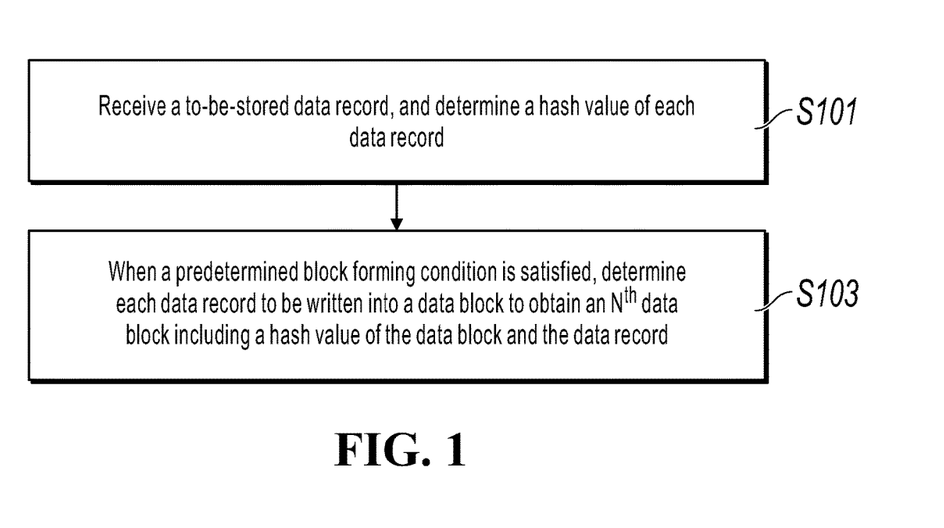
FIG. 1 is a schematic diagram illustrating a procedure of generating a blockchain-type ledger, according to an implementation of the present specification.

A centralized blockchain-type ledger in the implementations of the present specification is first described. At a centralized database service provider, a blockchain-type ledger is generated in the following method. As shown in FIG. 1, FIG. 1 is a schematic diagram illustrating a procedure of generating a blockchain-type ledger, according to an implementation of the present specification. The procedure includes the following steps.

S101. Receive a to-be-stored data record, and determine a hash value of each data record.

The to-be-stored data record here can be various expense records of an individual user of a client, or can be a service result, an intermediate state, an operation record, etc. that is generated by an application server when the application server executes service logic based on an instruction of a user. Specific service scenarios can include an expense record, an audit log, a supply chain, a government supervision record, a medical record, etc.

S103. When a predetermined block forming condition is satisfied, determine each data record to be written into a data block to generate an $N^{th}$ data block including a hash value of the data block and the data record.

The predetermined block forming condition includes: a quantity of to-be-stored data records reaches a quantity threshold. For example, a new data block is generated each time one thousand data records are received, and the one thousand data records are written into the block. Alternatively, a time interval from a previous block forming moment reaches a time threshold. For example, a new data block is generated every five minutes, and data records received in the five minutes are written into the block.

N here is a sequence number of a data block. In other words, in some implementations of the present specification, data blocks are arranged in a form of a blockchain and in a sequence of block forming times, and have a strong time sequence feature. A block height of the data block is monotonously increased in the sequence of block forming times. The block height can be a sequence number, and in this case, a block height of the $N^{th}$ data block is N. The block height can be generated in another method. For example, a block forming time of the data block is converted into a monotonously increasing large integer through symmetric encryption, and the integer is used as the block height.

When N=1, that is, the data block in this case is an initial data block, a hash value and a block height of the initial data block are given based on a predetermined method. For example, if the initial data block includes no data record, the hash value is any given hash value, and the block height blknum=0. For another example, a trigger condition for generating the initial data block is consistent with a trigger condition for another data block, but the hash value of the initial data block is determined by performing hashing on all content in the initial data block.

When N>1, because content and a hash value of a previous data block (namely, an $(N-1)^{th}$ data block) are determined, a hash value of a current data block (the $N^{th}$ data block) can be generated based on the hash value of the previous data block. For example, in a feasible method, a hash value of each data record to be written into the $N^{th}$ data block is determined, a Merkle tree is generated in an arrangement order of the data records in the block, a root hash value of the Merkel tree is connected with the hash value of the previous data block, and the hash value of the current block is generated by using a hash algorithm again. For another example, data records in a block can be connected in a sequence of the data records, and a hash value of an overall data record is obtained by performing hashing on the data records, the hash value of the previous data block is connected with the hash value of the overall data record, and a hash operation is performed on a string obtained through connection to generate the hash value of the data block.

After successfully uploading data, a user can obtain and store a hash value of a corresponding data record and a hash value of a data block where the data record is located, and can initiate integrity verification based on the hash value. A specific verification method is as follows: The hash value of the data record and the hash value of the data block where the data record is located are recalculated in a database, and the hash values are compared with the locally stored hash values.

In the previous data block generation method, each data block is determined by using a hash value, and the hash value of the data block is determined by content and a sequence of data records in the data block and a hash value of a previous data block. The user can initiate verification at any time based on the hash value of the data block. Modification to any content in the data block (including modification to the content or the sequence of the data records in the data block) causes inconsistency between a hash value of the data block calculated during verification and a hash value calculated during generation of the data block, leading to a verification failure. As such, immutability of the ledger can be realized under a centralized environment.

When a blockchain-type ledger is verified, continuous integrity verification is usually performed on a specified segment of data blocks, or continuous integrity verification is performed from an initial data block. A verification method is as follows: A hash value of a previous data block is obtained, and a hash value of the data block is recalculated based on a data record in the data block and the hash value of the previous data block by using an algorithm the same with that used when a hash value of the data block is generated and, and the hash value of the data block is compared with the previous hash value.

The blockchain-type ledger in the implementations of the present specification is described above. In practice, a user can create a corresponding ledger in a database server, and write a data record related to the user into the ledger. For example, in an application scenario, the user can perform, by using a client, asset-related behaviors with a service party, for example, purchasing/selling funds or insurances. As a result, corresponding asset change records are generated. In this case, the user can actively write the corresponding asset change records into the ledger for storage.

In addition, the service party usually generate delivery lists, reconciliation lists, etc. related to the user, and some services that do not need to be actively operated by the user, such as interest and dividend calculation. In this case, the user also needs the service party to write this data record into the ledger for storage.

Figure 2:
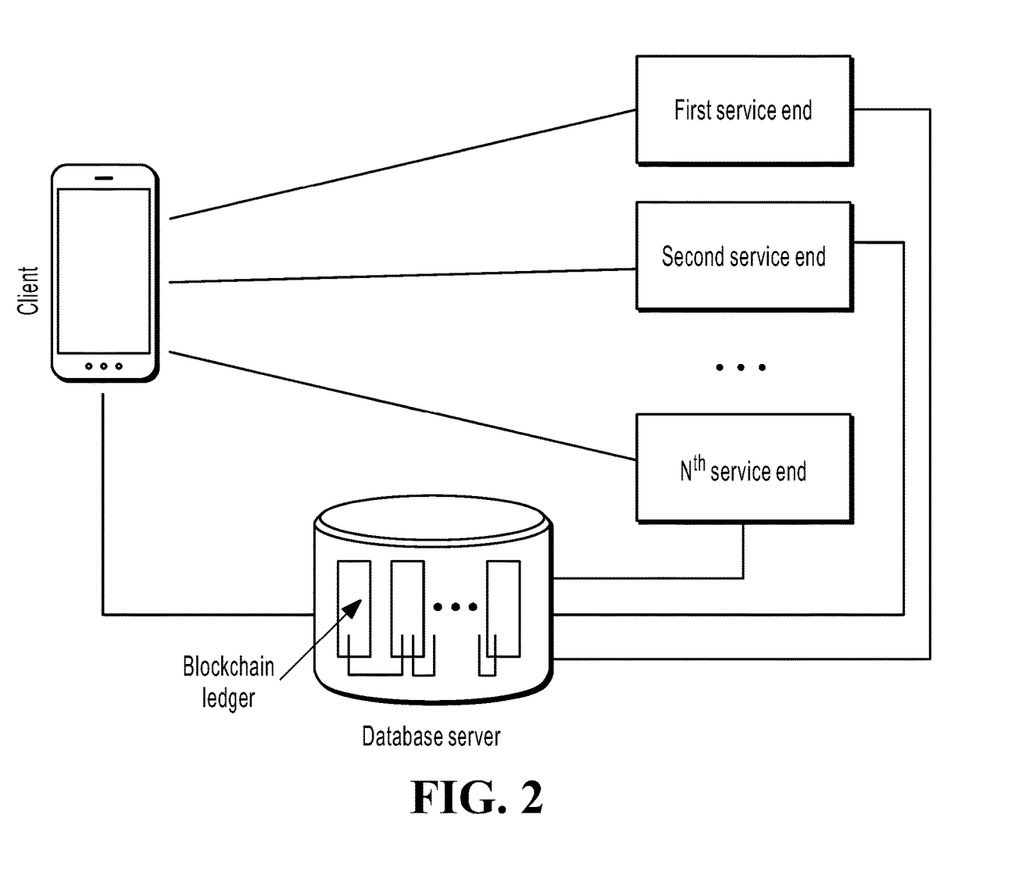
FIG. 2 is a schematic diagram illustrating a system architecture, according to an implementation of the present specification.

It is worthwhile to note that the blockchain-type ledger in the implementations of the present specification is used for storage, and a specific explanation of a service is not needed. Therefore, a user usually hopes to store related data records of the user in a centralized method, that is, write data records generated by different service parties into the same ledger for storage. However, the user may simultaneously have services with a plurality of service parties (for example, a fund company A and a securities company B). As shown in FIG. 2, FIG. 2 is a schematic diagram illustrating a system architecture, according to an implementation of the present specification. The user can have services with a plurality of service ends by using a client. In addition, both the client and the service end can write generated related information into a database server.

Based on this, the implementations of the present specification provide an authorization solution in a blockchain-type ledger, so that a user can conveniently perform corresponding authorization management on a user in a ledger of the user.

Figure 3:
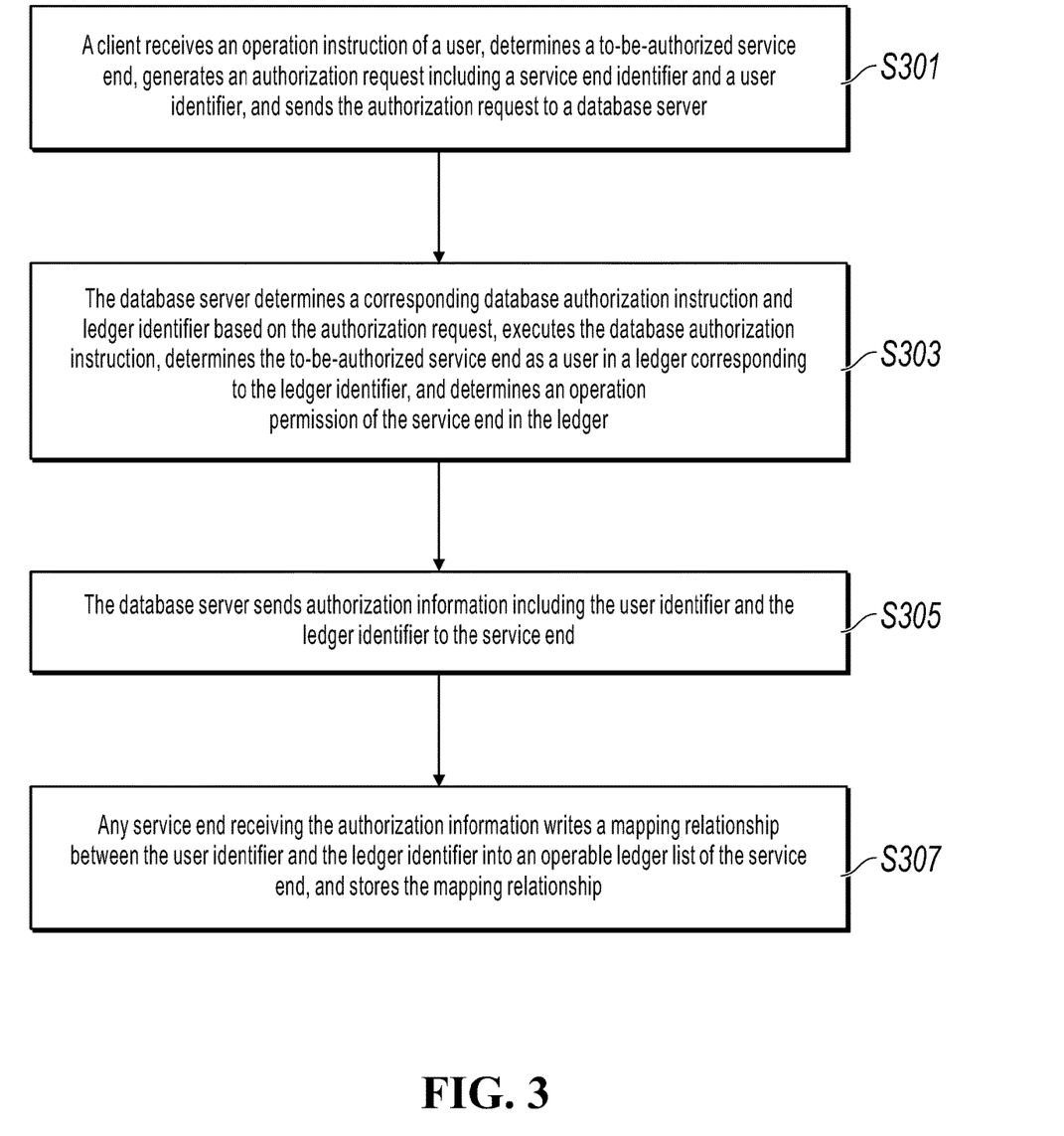
FIG. 3 shows an authorization method in a blockchain-type ledger, according to an implementation of the present specification.

The technical solutions provided in the implementations of the present specification are described below in detail with reference to the accompanying drawings. As shown in FIG. 3, FIG. 3 shows an authorization method in a blockchain-type ledger, according to an implementation of the present specification. The method is applied to systems including a client, a database server, and a service end, and includes:

S301. The client receives an operation instruction of a user, determines a to-be-authorized service end, generates an authorization request including a service end identifier and a user identifier, and sends the authorization request to the database server.

In the client, for a service end that needs to be authorized, the user can correspondingly acknowledge the service end when creating the ledger, or can acknowledge the service end after creating the ledger.

In an implementable method, in the client, a plurality of service end lists are provided to the user for selection, and the user determines the corresponding to-be-authorized service end from the list.

In another implementable method, after the user creates the ledger, the user initiates authorization recommendation when the user has a transaction with a service end in the client. The user determines, based on the authorization recommendation, whether the service end of the transaction needs to be authorized in the ledger.

After determining the to-be-authorized service end, the client can obtain the corresponding user identifier, generate the corresponding authorization request, where the authorization request includes the user identifier and the service end identifier, and send the authorization request to the database server.

In an implementation, if the user creates a plurality of different ledgers in the database server, the client can further provide a plurality of ledgers to the user for selection, determine a corresponding ledger identifier based on a selection instruction of the user. Further, the authorization request includes the ledger identifier acknowledged by the user.

S303. The database server determines a corresponding database authorization instruction and ledger identifier based on the authorization request, executes the database authorization instruction, determines the to-be-authorized service end as a user in a ledger corresponding to the ledger identifier, and determines an operation permission of the service end in the ledger.

After receiving the authorization request, the database server can obtain the ledger identifier in the authorization instruction when the authorization instruction includes the ledger identifier LID; or can determine the ledger identifier corresponding to the user identifier based on the user identifier in the authorization instruction.

Further, the database server can convert the authorization request into a corresponding database authorization instruction, including corresponding authorization instructions such as CreatRole/CreatMember and Grant. The authorization instruction includes the service end identifier and the corresponding ledger identifier.

For example, an example database authorization instruction can be in the following form: A CreatRole (&name, LID), where "name" is the service end identifier, and "LID" is the ledger identifier. The user "name" is added to the ledger "LID" in this method.

Further, a corresponding permission value can be configured for the service end in the ledger, for example, Grant (&name, weight), so that a corresponding operation permission "weight" can be configured for the service end in the ledger. A specific permission value can be read from a permission configuration file predetermined by the user. For example, a new user is usually given only a "read-only" permission.

After an operation is performed on a database by using the authorization instruction, the database can return corresponding execution result information to indicate that the operation succeeds.

S305. The database server sends authorization information including the user identifier and the ledger identifier to the service end.

The database server can package the execution result information, the user identifier, and the ledger identifier above to generate the authorization information, and send the authorization information to the service end in the authorization request. The authorization information can further include an operation permission.

S307. Any service end receiving the authorization information writes a mapping relationship between the user identifier and the ledger identifier into an operable ledger list of the service end, and stores the mapping relationship.

The operable ledger list is stored locally at any service end, and is used to store a mapping relationship between an identifier LID of a ledger that can be operated by the service end and a user ID, to indicate a ledger into which the service end should write information about a user. In addition, the operable ledger list further include an operation permission granted to the user. A specific degree at which the service end can operate the ledger is limited by the operation permission granted to the user. Usually, the operation permission can be a "write" permission. Table 1 shows an example operable ledger list provided in some implementations of the present specification. To be specific, the service end can write a related report generated by the user "ID1" into the $2112^{th}$ ledger of the database server.

TABLE 1

| UserID | LID | Weight |
|--------|------|--------|
| ID1    | 2112 | 20     |
| ID100  | 3311 | 20     |
| ...    | ...  | ...    |

In the solution in some implementations of the present specification, the client initiates the authorization request to the database server based on an instruction of the user. The database server converts the authorization request into a corresponding database command operation, and adds a new user to the ledger and determines a user permission by using a database command. In addition, the service end updates the operable ledger list of the user, so that a service party can write a service record related to the user into the ledger.

In an implementation, to ensure authenticity of a data record in the ledger, when writing data, the service end needs to add a digital signature for the data to be written (that is, encrypt the data by using a private key of the service end). In this case, the database server can obtain corresponding public key information of the service end (the public key information is a character string, and can be used to symmetrically decrypt the data encrypted by using the private key), and write the public key information into a permission configuration file of the ledger of the user. Therefore, the user can obtain a corresponding public key from the ledger to decrypt data written into the ledger by the service end.

Table 2 shows a form of an example permission configuration table provided in some implementations of the present specification. Key1 and key2 in the table respectively represent public key information of users ROLE01 and ROLE02.

TABLE 2

| User and Weight Value System Table | | |
|------|------|------|
| User name | Weight value | Public_Key |
| SYSADM | 100  |      |
| ROLE01 | 50   | Key1 |
| ROLE02 | 25   | Key2 |

Public key information of any service end is public to all users, and any user can obtain the public key information at any time. Therefore, the database server can obtain the public key information of a service end from the service end at any time, or a corresponding table of public key information of service ends is established in the database server to obtain the public key information of a service end from the table at any time.

In an implementation, the database server can further generate a data record including the database authorization instruction while executing the database authorization instruction, and write the data record into the ledger corresponding to the ledger identifier. In this method, the authorization instruction can be stored in the ledger in a form of a data record. Because the data record in the ledger cannot be tampered with, this authorization behavior is permanently stored and can exist as evidence.

In this implementation, the database server can further simultaneously return a hash value of the data record to the client and the service end, so that the client and the service end can query and verify the data record based on the hash value.

In this implementation, when generating the data record including the database authorization instruction, the database server can further add the public key information of the service end to the data record. Therefore, the public key information of the service end can also be stored in the ledger in a form of data that cannot be tampered with.

Because in this case, the database server writes the authorization instruction and the public key information into the ledger, in this process, the database server can further add a digital signature for the data record including the authorization instruction and/or the public key information, so as to ensure that the database server does not deceive the client or the service end.

In an implementation, after the ledger is generated, the service end can further send the corresponding prompt information to the client when the service end needs to write corresponding information into the ledger but has no permission. For example, at the end of a month, when first interest payment of individuals needs to be settled by using a service system for the XX fund, and is found that ledgers of some users has no writing permission, at this time, a fund service end can send authorization prompt information including the service end identifier to the user. After receiving the authorization prompt information, the client acknowledges the service end identifier to generate the authorization request including the service end identifier.

Further, the client can remove or de-authorize an authorized service end. A specific method is as follows:

The client receives an operation instruction of a user, determines a to-be-de-authorized service end, generates a de-authorization request including a service end identifier and a user identifier, and sends the de-authorization request to the database server.

Correspondingly, the database server determines a corresponding database de-authorization instruction and ledger identifier based on the de-authorization request, and executes the database de-authorization instruction to cancel the operation permission of the service end in the ledger. The de-authorization instruction here can be implemented in a form of a Grant instruction, for example, Grant (&name, 0), that is, a permission of a user in the ledger is set to a minimum value, so that the service end have no operation permission of the ledger.

Correspondingly, the database server sends de-authorization information including the user identifier and the ledger identifier to the service end.

Any service end receiving the de-authorization information deletes the mapping relationship between the user identifier and the ledger identifier from the operable ledger list of the service end.

In the above method, the user can conveniently cancel, in the client, a ledger permission of a service end no longer has service transactions with the user.

Correspondingly, an implementation of the present specification further provides an authorization system in a blockchain-type ledger, including a client, a database server, and a service end.

In the system, the client receives an operation instruction of a user, determines a to-be-authorized service end, generates an authorization request including a service end identifier and a user identifier, and sends the authorization request to the database server.

The database server determines a corresponding database authorization instruction and a ledger identifier based on the authorization request, executes the database authorization instruction, determines the to-be-authorized service end as a user in a ledger corresponding to the ledger identifier, and determines an operation permission of the service end in the ledger.

The database server sends authorization information including the user identifier and the ledger identifier to the service end.

Any service end receiving the authorization information writes a mapping relationship between the user identifier and the ledger identifier into an operable ledger list of the service end, and stores the mapping relationship.

Further, in the system, the database server obtains public key information of the service end, and writes the public key information of the service end into a permission configuration file of the ledger.

Further, in the system, the database server generates a data record including the database authorization instruction, and writes the data record into the ledger corresponding to the ledger identifier.

Further, in the system, the database server obtains the public key information of the service end, generates a data record including the database authorization instruction and the public key information, and writes the data record into the ledger.

Further, in the system, the client receives an acknowledgment instruction of the user for authorization prompt information sent by the service end, and generates the authorization request including the service end identifier.

Further, in the system, the client receives an operation instruction of a user, determines a to-be-de-authorized service end, generates a de-authorization request including a service end identifier and a user identifier, and sends the de-authorization request to the database server. Correspondingly, the database server determines a corresponding database de-authorization instruction and ledger identifier based on the de-authorization request, and executes the database de-authorization instruction to cancel the operation permission of the service end in the ledger. Correspondingly, the database server sends the de-authorization information including the user identifier and the ledger identifier to the service end. Any service end receiving the de-authorization information deletes the mapping relationship between the user identifier and the ledger identifier from the operable ledger list of the service end.

Further, in the database server in the system, a data block in the blockchain-type ledger is pre-generated in the following method: receiving a to-be-stored data record, and determining a hash value of each data record; and when a predetermined block forming condition is satisfied, determining each data record to be written into a data block to generate an $N^{th}$ data block including a hash value of the data block and the data record specifically includes: when N=1, giving a hash value and a block height of an initial data block based on a predetermined method; and when N>1, determining a hash value of the $N^{th}$ data block based on each data record to be written into the data block and a hash value of an $(N-1)^{th}$ data block, to generate the $N^{th}$ data block including the hash value of the $N^{th}$ data block and each data record.

Figure 4:
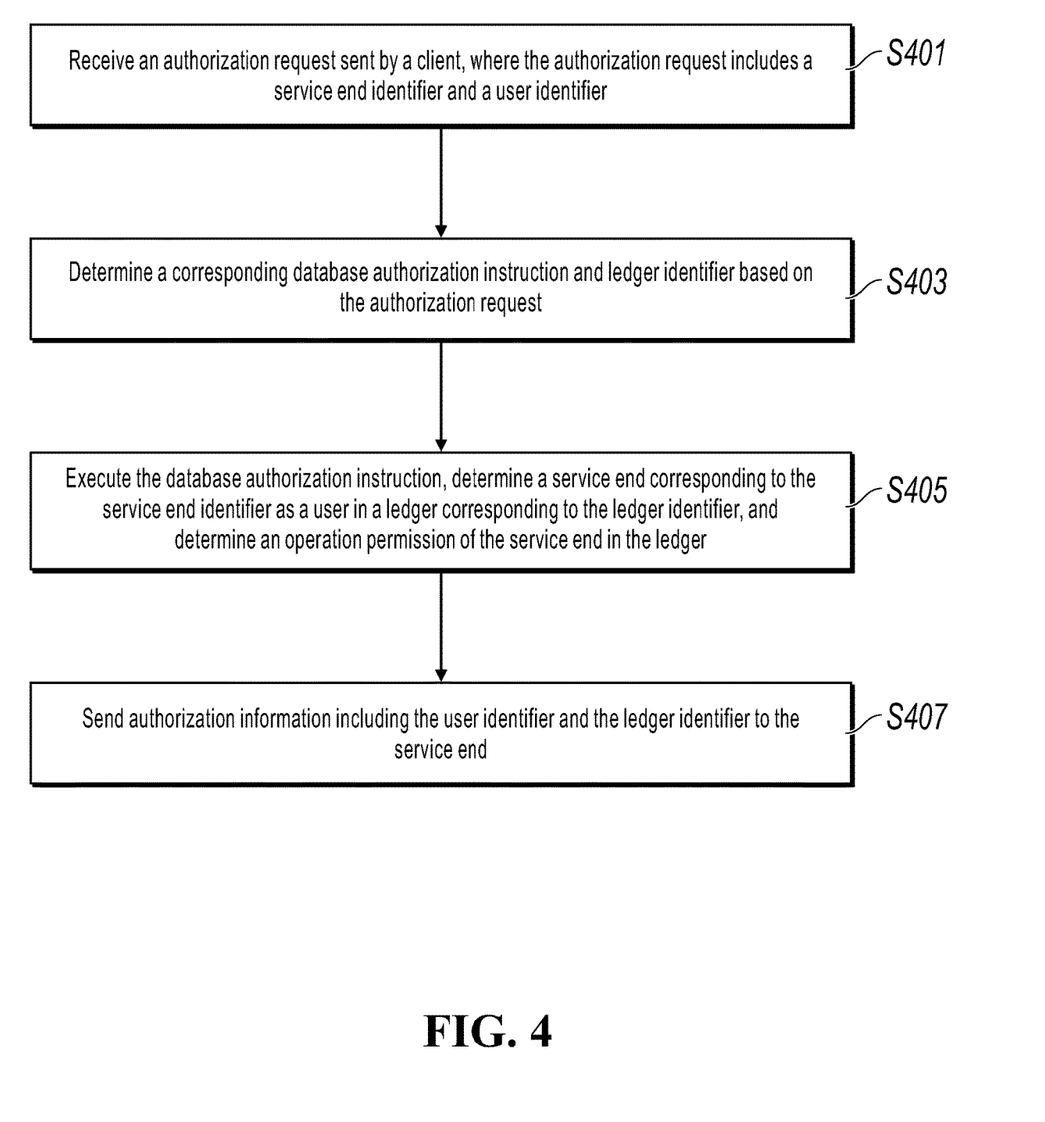
FIG. 4 is an authorization method in a blockchain-type ledger applied to a database server, according to an implementation of the present specification.

In another aspect, an implementation of the present specification further provides an authorization method in a blockchain-type ledger, and the method is applied to a database server. As shown in FIG. 4, FIG. 4 shows an authorization method in a blockchain-type ledger applied to a database server. The method includes the following steps:

S401. Receive an authorization request sent by a client, where the authorization request includes a service end identifier and a user identifier.

S403. Determine a corresponding database authorization instruction and ledger identifier based on the authorization request.

S405. Execute the database authorization instruction, determine a service end corresponding to the service end identifier as a user in a ledger corresponding to the ledger identifier, and determine an operation permission of the service end in the ledger.

S407. Send authorization information including the user identifier and the ledger identifier to the service end.

Figure 5:
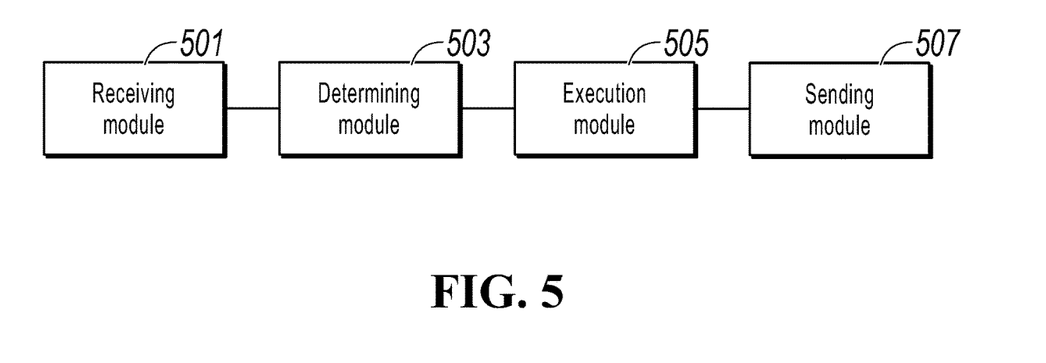
FIG. 5 is a schematic structural diagram illustrating an authorization apparatus in a blockchain-type ledger, according to an implementation of the present specification.

Corresponding to the another aspect, an implementation of the present specification further provides an authorization apparatus in a blockchain apparatus, and the apparatus is applied to a database server. As shown in FIG. 5, FIG. 5 is a schematic structural diagram illustrating an authorization apparatus in a blockchain-type ledger, according to an implementation of the present specification. The apparatus includes: a receiving module 501, configured to receive an authorization request sent by a client, where the authorization request includes a service end identifier and a user identifier; a determining module 503, configured to determine a corresponding database authorization instruction and ledger identifier based on the authorization request; an execution module 505, configured to: execute the database authorization instruction, determine a service end corresponding to the service end identifier as a user in a ledger corresponding to the ledger identifier, and determine an operation permission of the service end in the ledger; and a sending module 507, configured to send authorization information including the user identifier and the ledger identifier to the service end.

An implementation of the present specification further provides a computer device. The computer device includes at least a memory, a processor, and a computer program that is stored in the memory and that can run on the processor. When executing the program, the processor performs the authorization method in a blockchain-type ledger shown in FIG. 4.

Figure 6:
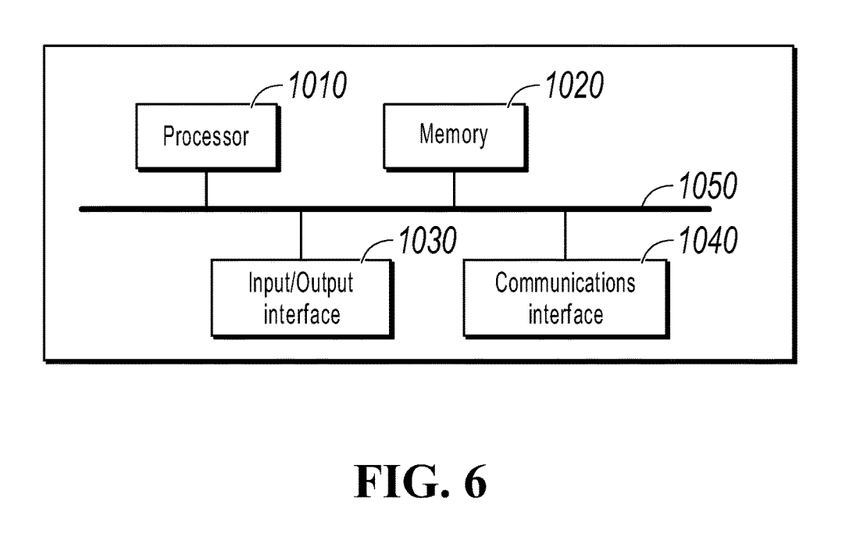
FIG. 6 is a schematic structural diagram illustrating a device used to configure the method in an implementation of the present specification.

FIG. 6 is a schematic structural diagram illustrating a more specific hardware structure of a computing device, according to an implementation of the present specification. The device may include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 may be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 may be implemented in a form of a read-only memory (ROM), a random access memory (RAM), a static storage device, a dynamic storage device, etc. The memory 1020 may store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module (not shown in the figure) may be configured as a component in the device, or may be externally connected to the device to provide corresponding functions. The input device may include a keyboard, a mouse, a touchscreen, a microphone, various sensors, etc. The output device may include a display, a speaker, a vibrator, an indicator, etc.

The communications interface 1040 is configured to connect to a communications module (not shown in the figure), so as to implement communication and interaction between the device and another device. The communications module may implement communication in a wired method (for example, a USB or a network cable), or may implement communication in a wireless method (for example, a mobile network, WiFi, or Bluetooth).

The bus 1050 includes a channel for transmitting information between components (for example, the processor 1010, the memory 1020, the input/output interface 1030, and the communications interface 1040) of the device.

It is worthwhile to note that though the previous device shows only the processor 1010, the memory 1020, the input/output interface 1030, the communications interface 1040, and the bus 1050, in a specific implementation process, the device may further include another component required to implement normal operation. In addition, a person skilled in the art may understand that the previous device may include only components required to implement the solutions in the implementations of the present specification, and does not need to include all the components shown in the figure.

An implementation of the present specification further provides a computer readable storage medium. The computer readable storage medium stores a computer program, and when a processor executes the program, the authorization method for a blockchain-type ledger shown in FIG. 4 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method comprising:
receiving, by a server storing one or more blockchain ledgers, an authorization request from a client, wherein the authorization request comprises a service end identifier and a user identifier;

generating, based on the authorization request, a database authorization instruction corresponding to the authorization request and a ledger identifier corresponding to the authorization request;

authorizing a service end corresponding to the service end identifier as a user in a blockchain ledger corresponding to the ledger identifier;

configuring a permission value of the user in the blockchain ledger, wherein the permission value determines a degree to which the service end can operate the blockchain ledger;

sending authorization information comprising the user identifier and the ledger identifier to the service end;

receiving, by the server, a de-authorization request from the client, wherein the de-authorization request comprises a second service end identifier and a second user identifier;

determining a database de-authorization instruction based on the de-authorization request and a second ledger identifier based on the de-authorization request;

cancelling, in a second blockchain ledger corresponding to the second ledger identifier, operation permissions of a second service end corresponding to the second service end identifier; and sending, to the second service end, de-authorization information comprising the second user identifier and the second ledger identifier.

2. The computer-implemented method of claim 1, wherein configuring the permission value of the user comprises:

obtaining, by the server, public key information of the service end; and writing the public key information of the service end into a permission configuration file corresponding to the blockchain ledger.

3. The computer-implemented method of claim 1, further comprising:

generating a first data record comprising the database authorization instruction; and writing the first data record into the blockchain ledger corresponding to the ledger identifier.

4. The computer-implemented method of claim 3, further comprising obtaining public key information of the service end, wherein the first data record comprises the public key information of the service end.

5. The computer-implemented method of claim 3, further comprising:

sending a hash value of the first data record to the client and to the service end.

6. The computer-implemented method of claim 1, wherein, responsive to the authorization information being received by the service end, a mapping relationship between the user identifier and the ledger identifier is written into an operable ledger list stored at the service end.

7. A non-transitory, computer-readable medium storing one or more instructions executable by a computer system to perform operations comprising:

receiving, by a server storing one or more blockchain ledgers, an authorization request from a client, wherein the authorization request comprises a service end identifier and a user identifier;

generating, based on the authorization request, a database authorization instruction corresponding to the authorization request and a ledger identifier corresponding to the authorization request;

authorizing a service end corresponding to the service end identifier as a user in a blockchain ledger corresponding to the ledger identifier;

configuring a permission value of the user in the blockchain ledger, wherein the permission value determines a degree to which the service end can operate the blockchain ledger;

sending authorization information comprising the user identifier and the ledger identifier to the service end;

receiving, by the server, a de-authorization request from the client, wherein the de-authorization request comprises a second service end identifier and a second user identifier;

determining a database de-authorization instruction based on the de-authorization request and a second ledger identifier based on the de-authorization request;

cancelling, in a second blockchain ledger corresponding to the second ledger identifier, operation permissions of a second service end corresponding to the second service end identifier; and sending, to the second service end, de-authorization information comprising the second user identifier and the second ledger identifier.

8. The computer-readable medium of claim 7, wherein configuring the permission value of the user comprises:

obtaining, by the server, public key information of the service end; and writing the public key information of the service end into a permission configuration file corresponding to the blockchain ledger.

9. The computer-readable medium of claim 7, wherein the operations further comprise:

generating a first data record comprising the database authorization instruction; and writing the first data record into the blockchain ledger corresponding to the ledger identifier.

10. The computer-readable medium of claim 9, wherein the operations further comprise obtaining public key information of the service end, and wherein the first data record comprises the public key information of the service end.

11. The computer-readable medium of claim 9, wherein the operations further comprise:

sending a hash value of the first data record to the client and to the service end.

12. The computer-readable medium of claim 7, wherein, responsive to the authorization information being received by the service end, a mapping relationship between the user identifier and the ledger identifier is written into an operable ledger list stored at the service end.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a server storing one or more blockchain ledgers, an authorization request from a client, wherein the authorization request comprises a service end identifier and a user identifier;

generating, based on the authorization request, a database authorization instruction corresponding to the authorization request and a ledger identifier corresponding to the authorization request;

authorizing a service end corresponding to the service end identifier as a user in a blockchain ledger corresponding to the ledger identifier;

configuring a permission value of the user in the blockchain ledger, wherein the permission value determines a degree to which the service end can operate the blockchain ledger;

sending authorization information comprising the user identifier and the ledger identifier to the service end;

receiving, by the server, a de-authorization request from the client, wherein the de-authorization request comprises a second service end identifier and a second user identifier;

determining a database de-authorization instruction based on the de-authorization request and a second ledger identifier based on the de-authorization request;

cancelling, in a second blockchain ledger corresponding to the second ledger identifier, operation permissions of a second service end corresponding to the second service end identifier; and sending, to the second service end, de-authorization information comprising the second user identifier and the second ledger identifier.

14. The computer-implemented system of claim 13, wherein configuring the permission value of the user comprises:
obtaining, by the server, public key information of the service end; and
writing the public key information of the service end into a permission configuration file corresponding to the blockchain ledger.

15. The computer-implemented system of claim 13, wherein the operations further comprise:
generating a first data record comprising the database authorization instruction; and
writing the first data record into the blockchain ledger corresponding to the ledger identifier.

16. The computer-implemented system of claim 15, wherein the operations further comprise obtaining public key information of the service end, and
wherein the first data record comprises the public key information of the service end.

17. The computer-implemented system of claim 13, wherein, responsive to the authorization information being received by the service end, a mapping relationship between the user identifier and the ledger identifier is written into an operable ledger list stored at the service end.

* * * * *

UNITED STATES PATENT AND TRADEMARK OFFICE
CERTIFICATE OF CORRECTION

Page 1 of 1

PATENT NO. : 10,789,376 B2
APPLICATION NO. : 16/805649
DATED : September 29, 2020
INVENTOR(S) : Yan et al.

It is certified that error appears in the above-identified patent and that said Letters Patent is hereby corrected as shown below:

On the Title Page

Column 2, item (74), under Attorney Agent, or Firm, Line 1, delete "P.C" and insert -- P.C. --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*